(12) United States Patent
Wen et al.

(10) Patent No.: US 10,030,806 B2
(45) Date of Patent: Jul. 24, 2018

(54) FIXING SUPPORT AND FIXING MODULE

(71) Applicant: HTC Corporation, Taoyuan (TW)

(72) Inventors: Hung-Chuan Wen, Taoyuan (TW);
Jui-Hsiang Lin, Taoyuan (TW);
Jen-Yang Chang, Taoyuan (TW);
Chang-Hua Wei, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/252,197

(22) Filed: Aug. 30, 2016

(65) Prior Publication Data
US 2018/0058623 A1    Mar. 1, 2018

(51) Int. Cl.
*F16M 11/04* (2006.01)
*F16M 13/02* (2006.01)

(52) U.S. Cl.
CPC .......... *F16M 11/041* (2013.01); *F16M 13/02* (2013.01); *F16M 11/04* (2013.01)

(58) Field of Classification Search
CPC .... F16M 11/041; F16M 13/02; F16M 11/043; F16M 11/04; F16M 11/08; F16M 11/06; F16M 2200/00; F16M 2200/08
USPC ..... 248/219.4, 222.52, 220.21, 218.4, 309.1, 248/131; 232/39
See application file for complete search history.

(56) References Cited

U.S. PATENT DOCUMENTS

| | | | | |
|---|---|---|---|---|
| 3,407,997 A | * | 10/1968 | Wood | A47G 29/1216 232/39 |
| 5,400,958 A | * | 3/1995 | Walker | A47G 29/1216 232/39 |
| 5,497,214 A | | 3/1996 | Labree | |
| 5,622,343 A | * | 4/1997 | Morton | A47G 29/1216 232/17 |
| 5,699,989 A | * | 12/1997 | Guthrie | A47G 29/1216 232/39 |

(Continued)

FOREIGN PATENT DOCUMENTS

| | | |
|---|---|---|
| TW | 201343051 | 10/2013 |
| TW | M480491 | 6/2014 |

OTHER PUBLICATIONS

"Office Action of Taiwan Counterpart Application," dated May 31, 2017, p.1-p.6, in which the listed references were cited.

*Primary Examiner* — Nkeisha Smith
(74) *Attorney, Agent, or Firm* — JCIPRNET

(57) ABSTRACT

A fixing support is adapted to detachably fix a case onto a target object. The fixing support includes a fixing base, a rotary base, a rotary member and an engaging member. The rotary base is adapted to be assembled to the target object. The rotary member is rotatably disposed in the fixing base, and is fixed to the rotary base so as to rotate with the rotatory base on a rotational axis with respect to the fixing base. The engaging member is movably disposed inside the fixing base to be moved to a releasing position and an engaging position with respect to the fixing base according to the rotation of the rotary member. The engaging member has an engaging portion, and the engaging member is adapted to pass through the engaging hole. When the engaging member is moved to the engaging position from the releasing position with respect to the fixing base, the engaging portion engages a shoulder part of the engaging hole. In addition, a fixing module includes the aforesaid case and the aforesaid fixing support.

15 Claims, 7 Drawing Sheets

(56) References Cited

U.S. PATENT DOCUMENTS

| | | | | |
|---|---|---|---|---|
| 6,325,667 B2* | 12/2001 | Sawayanagi | ........... | H02B 1/044 |
| | | | | 439/34 |
| 7,163,141 B1* | 1/2007 | Parker | ................. | A47G 29/1216 |
| | | | | 232/39 |
| 7,350,755 B1* | 4/2008 | Harrison | ................. | B63B 17/00 |
| | | | | 248/214 |
| 7,934,607 B2* | 5/2011 | Henderson | ........... | H05K 7/1489 |
| | | | | 211/175 |
| 8,083,193 B2* | 12/2011 | Matsui | ................. | F16M 11/041 |
| | | | | 248/221.11 |
| 8,885,337 B2 | 11/2014 | Schanz et al. | | |
| 8,979,058 B2* | 3/2015 | Li | ................. | F16M 11/041 |
| | | | | 248/181.1 |
| 9,004,432 B2* | 4/2015 | Lacarra | ................. | A47B 88/43 |
| | | | | 211/26 |
| 9,027,892 B2* | 5/2015 | Boer | ................... | B60R 11/0235 |
| | | | | 248/222.52 |
| 9,433,314 B2* | 9/2016 | Schroeder | .............. | F16M 11/08 |
| 2010/0171832 A1 | 7/2010 | Solida | | |
| 2013/0288743 A1 | 10/2013 | Hunt et al. | | |
| 2014/0028243 A1* | 1/2014 | Rayner | ................... | G06F 1/163 |
| | | | | 320/103 |
| 2014/0328020 A1 | 11/2014 | Galant | | |
| 2014/0360893 A1* | 12/2014 | Whitten | ................. | A45C 11/00 |
| | | | | 206/45.2 |

* cited by examiner

FIXING SUPPORT AND FIXING MODULE

BACKGROUND

Technical Field

The present application is related to a fixing equipment, and more particularly, to fixing support and a fixing module configured to fix an article (e.g., a portable device) onto a target object.

Related Art

A fixing support is an accessory commonly used on a portable device (e.g., a Smart Phone, a Satellite Navigation and Global Positioning System, etc.). The portable device can be detachably fixed onto a target object (e.g., a bicycle frame, a stroller shank, a user's body, etc.) via the fixing support. Therefore, when the user intends to remove the portable device from the target object, the portable device can be disassembled from the fixing support.

SUMMARY

The present application provides a fixing support configured to detachably fix a case (an outer casing of a portable device or a protective shell coupled to the portable device) onto a target object.

The present application provides a fixing module, including the aforementioned protective shell and the fixing support, for coupling to the portable device and detachably fixing the portable device onto the target object.

A fixing support of the present application is adapted to detachably fix a case onto a target object. The case is a protective shell coupled to a portable device or an outer casing of the portable device, and the case has an engaging hole. The fixing support includes a fixing base, a rotary base, a rotary member and an engaging member. The rotary base is adapted to be assembled to the target object. The rotary member is rotatably disposed in the fixing base, and is fixed to the rotary base so as to rotate with the rotatory base on a rotational axis with respect to the fixing base. The engaging member is movably disposed inside the fixing base to be moved to a releasing position and an engaging position with respect to the fixing base according to a rotation of the rotary member. The engaging member has an engaging portion, and the engaging portion is adapted to pass through the engaging hole. When the engaging member is moved to the engaging position from the releasing position with respect to the fixing base, the engaging portion engages a shoulder part of the engaging hole.

A fixing module of the present application is adapted to be coupled to a portable device and to detachably fix the portable device to a target object. The fixing module includes the aforementioned case and the aforementioned fixing support.

In view of the above, in the present application, the fixing support adopts the means of rotation to engage or release the case. Therefore, via the fixing support, a user can single-handed rotate the case with respect to the target object so as to assemble the case onto the target object or disassemble the case from the target object.

In order to make the aforementioned and other features and advantages of the application comprehensible, several exemplary embodiments accompanied with figures are described in detail below.

DESCRIPTION OF THE EMBODIMENTS

Figure 1:
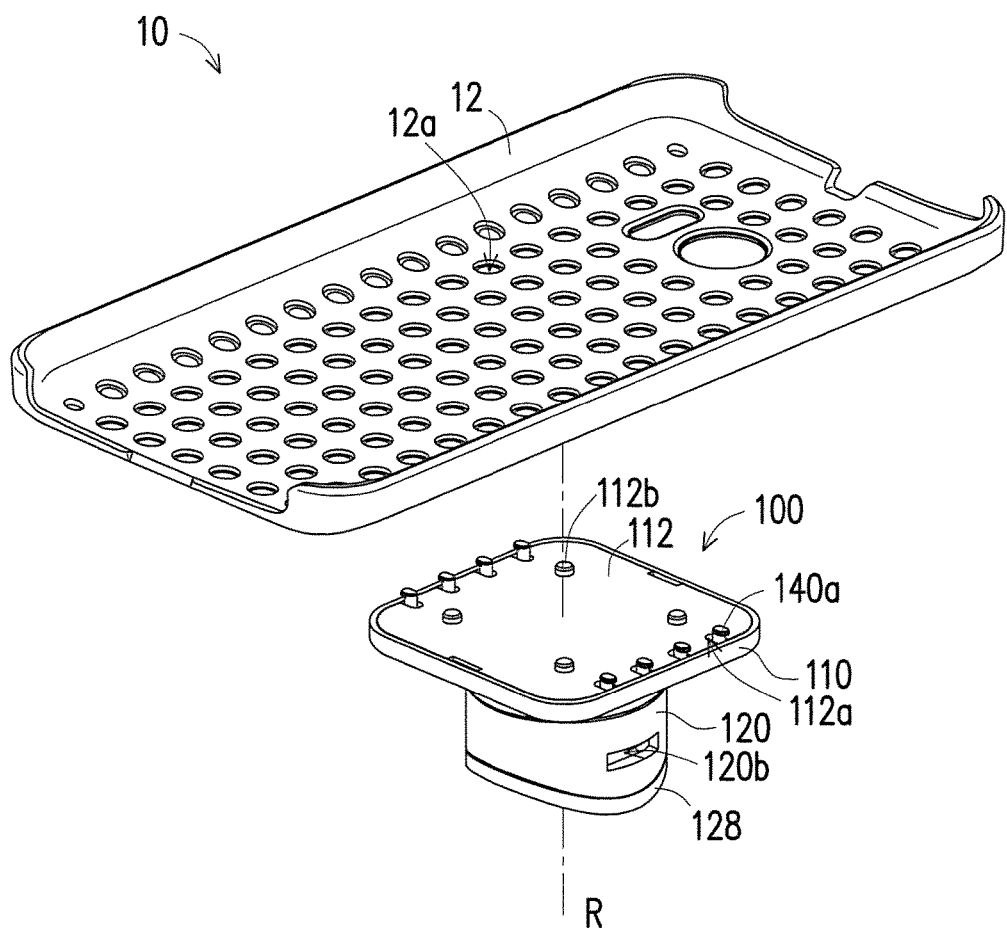
FIG. 1 is a perspective diagram illustrating a fixing module according to an embodiment of the present application.
Figure 2:
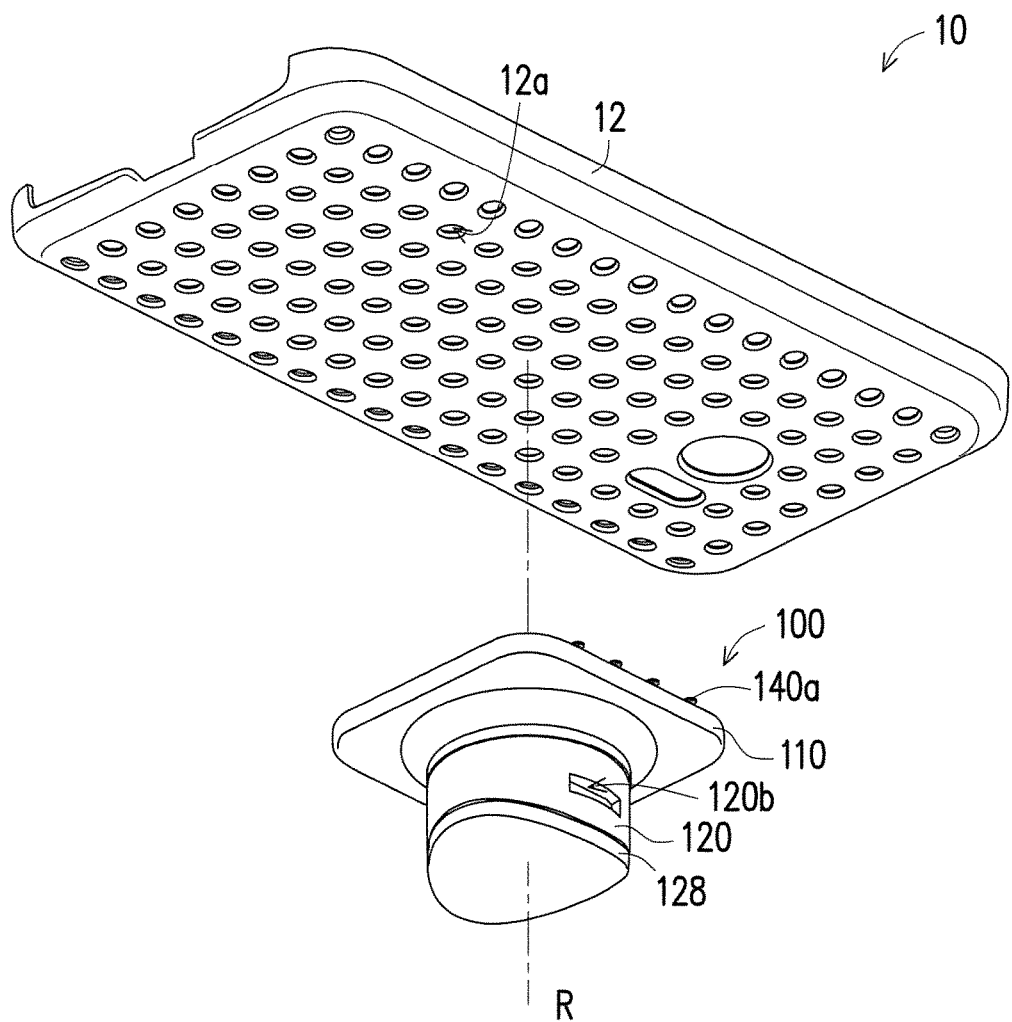
FIG. 2 is a perspective diagram illustrating the fixing module of FIG. 1 from another point of view.

Referring to FIG. 1 and FIG. 2, in the present embodiment, a fixing module 10 includes a case 12 and a fixing support 100. The fixing support 100 is adapted to detachably fix a case 12 onto a target object, such as bicycle frame, a stroller shank, a user's body, etc. In the present embodiment, the case 12 is a protective shell coupled to a portable device (e.g., a Smart Phone, a Satellite Navigation and Global Positioning System, etc.). In another embodiment (not shown), the case 12 may also be an outer casing of the portable device.

Figure 3:
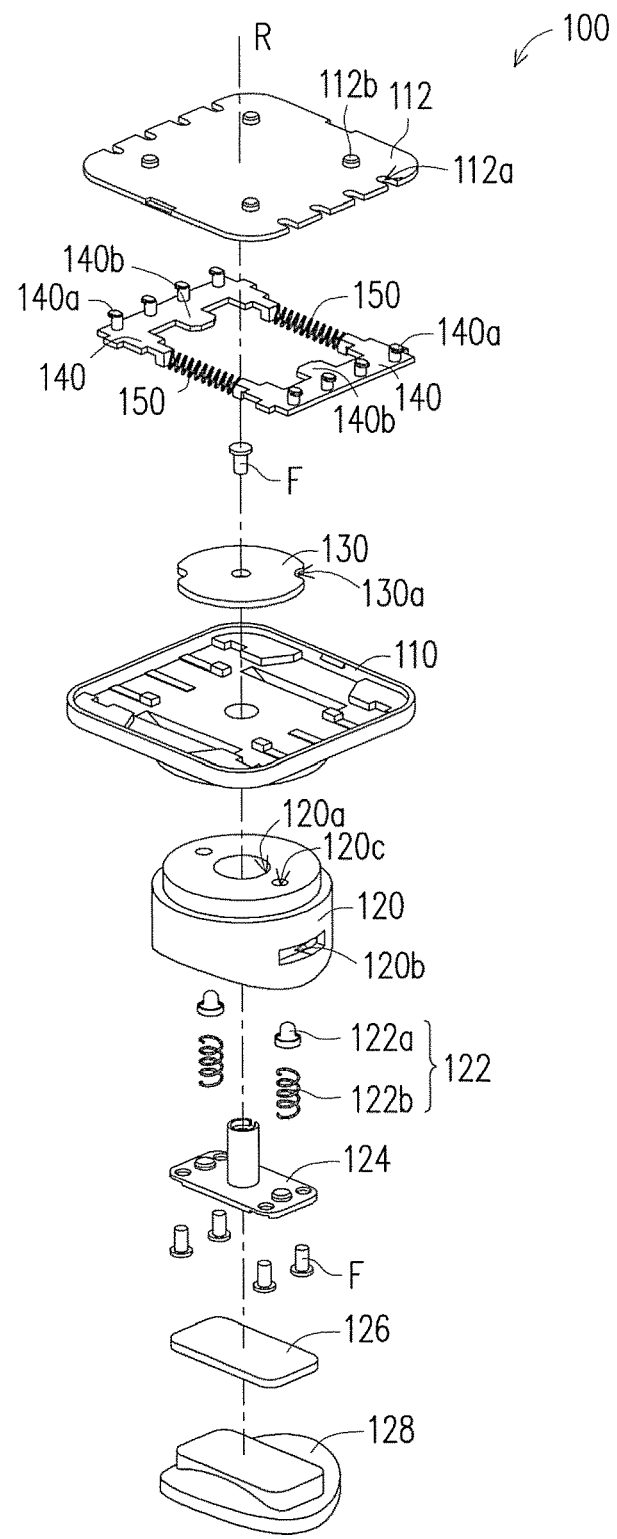
FIG. 3 is an exploded diagram of a fixing support of FIG. 1.
Figure 4:
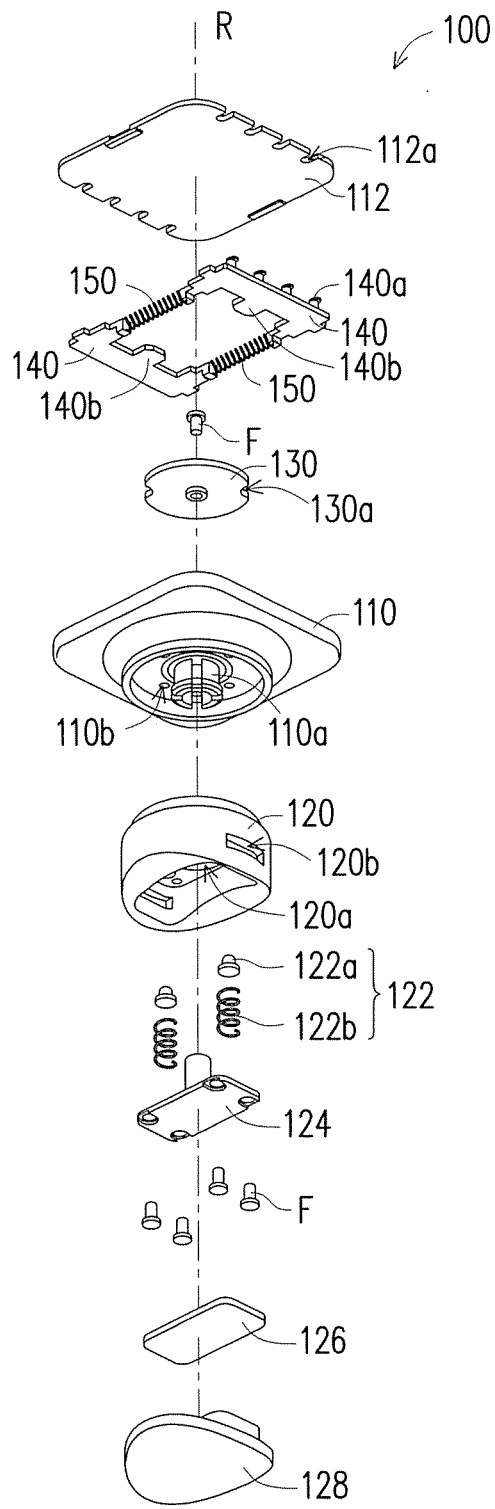
FIG. 4 is an exploded diagram of fixing support of FIG. 1 from another point of view.
Figure 5:
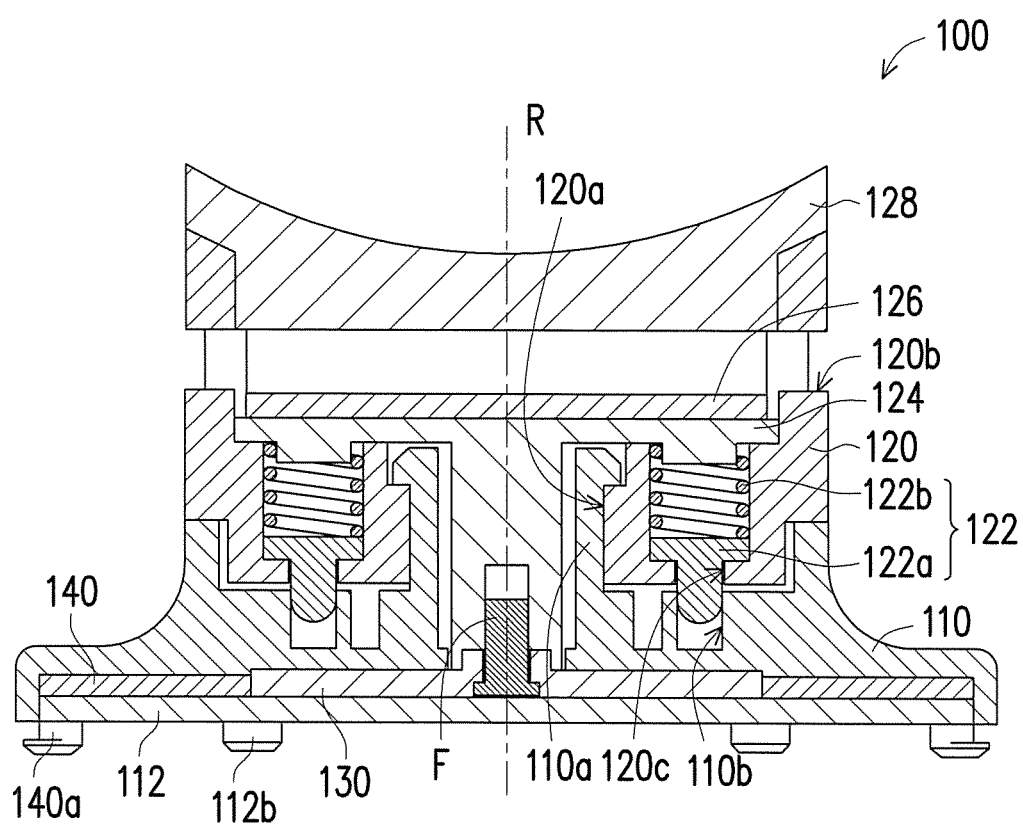
FIG. 5 is a cross-sectional diagram of the fixing support of FIG. 1.

Referring to FIG. 3, FIG. 4 and FIG. 5, in the present embodiment, the fixing support 100 includes a fixing base 110 and a rotary base 120. The rotary base 120 is pivoted to the fixing base 110 on a rotational axis R, and is adapted to assembled to the target object. Specifically, the fixing base 110 has a plurality of axial hooks 110a, the rotary base 120 has an axial engaging hole 120a, and the axial hooks 110a engage with the axial engaging hole 120a along the rotational axis R so as to enable the rotary base 120 to rotate along the rotational axis R with respect to the fixing base 110. The rotary base 120 can be fixed to the target object through an assembly band (not shown). For instance, the assembly band (e.g., a band clamp) can tie the rotary base 120 to the target object by passing through a slot 120b of the rotary base 120, but the present application is not limited thereto.

Referring to FIG. 3, FIG. 4 and FIG. 5, in the present embodiment, in order to fix the relative positions between the fixing base 110 and the rotary base 120, the fixing base 110 may have a plurality of positioning recesses 110b, such as a plurality of indentations in the fixing base 110. The rotary base 120 may have one or a plurality of positioning protrusions 122, and each positioning protrusion 122 includes an ejector member 122a and an elastic member 122b. The ejector member 122as and the elastic members 122b are accommodated in the rotary base 120, and the elastic member 122b applies an elastic force to the ejector member 122a with respect to the rotary base 120 so as to enable the ejector member 122a to protrude out of an opening of the rotary base 120 to collaborate with one of the positioning recesses 110b. When the rotary base 120 rotates to a specific angle (e.g., 0 degree, 90 degrees, 180 degrees or 360 degrees) with respect to the fixing base 110 until the positioning protrusions 122 (e.g., the ejector members 122a) respectively collaborate with a portion of the positioning recesses 110b, the rotary base 120 is enabled to be fixed at the specific angle (e.g., 0 degree, 90 degrees, 180 degrees or 360 degrees) with respect to the fixing base 110.

Referring to FIG. 3, FIG. 4 and FIG. 5, in the present embodiment, the fixing support 100 may have a mounting element 124, and may lock a plate-shaped portion of the mounting element to the rotary base 120 through a plurality of fasteners F (e.g., screws) so as to accommodate the positioning protrusions 122 (e.g., the ejector members 122a and the elastic members 122b) in the rotary base 120. In addition, the fixing support 100 may have a profiling element 128 connected to the rotary base 120 to match an external shape of the target object. During a process of assembling the profiling element 128 to the rotary base 120, a thin-film 126 and the profiling portion may be assembled with the rotary base 120 by means of adhesion. In another embodiment (not shown), the profiling element 128 may be directly formed by a part of the rotary base 120.

Figure 6A:
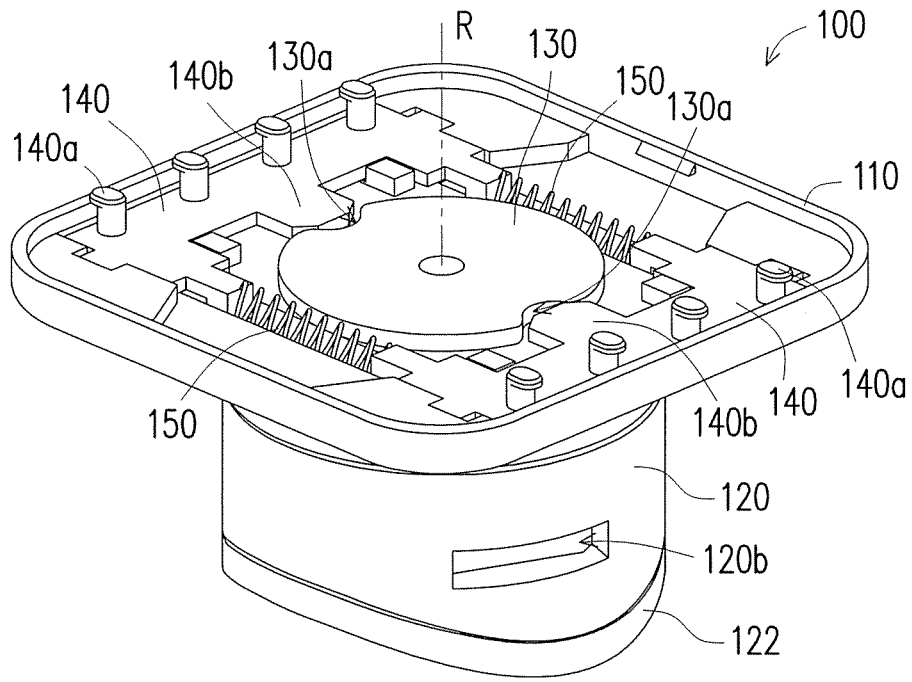
FIG. 6A and FIG. 6B are respectively perspective diagrams of the engaging member of the fixing support of FIG. 1 being at a releasing position and an engaging position with respect to the case.
Figure 6B:
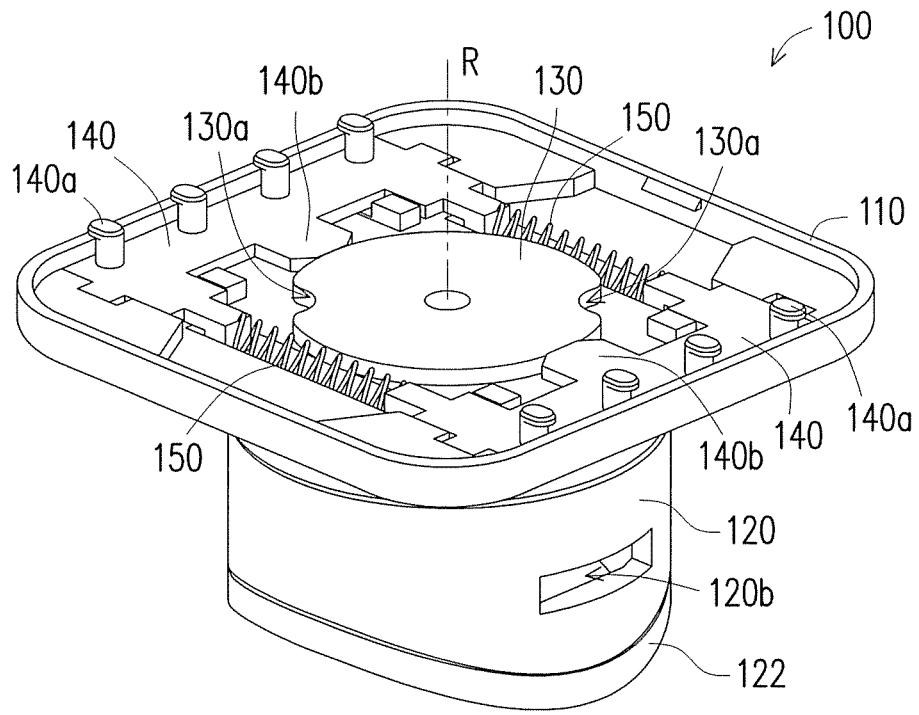
Figure 7A:
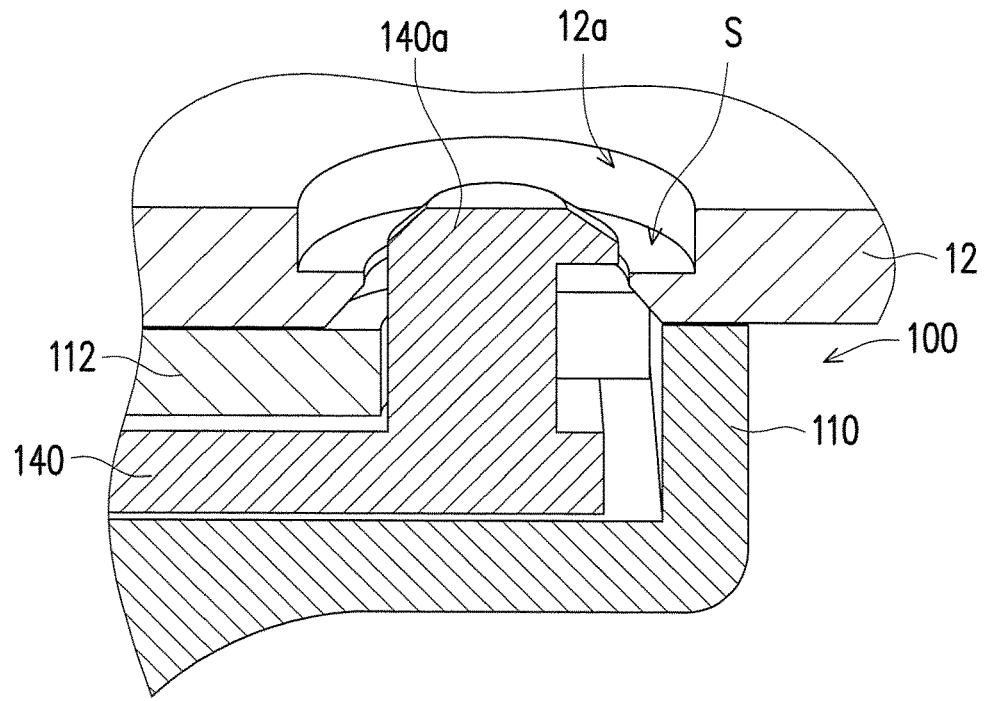
FIG. 7A and FIG. 7B are respectively partial cross-sectional diagrams of the engaging member of the fixing support of FIG. 1 being at the releasing position and the engaging position with respect to the case.
Figure 7B:
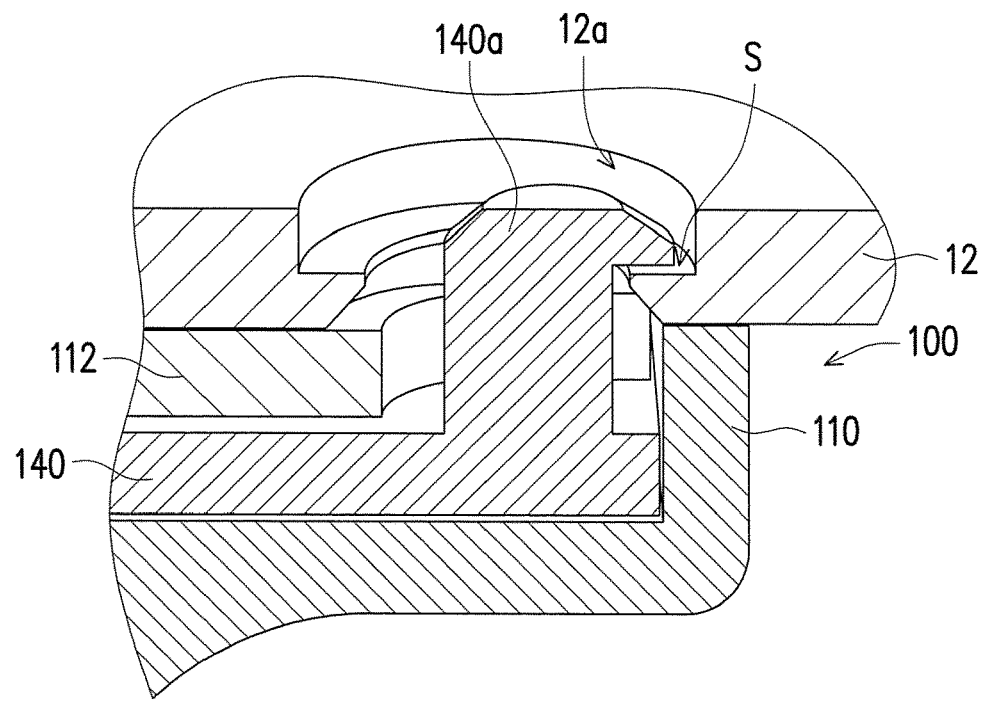

Referring to FIG. 3, FIG. 4, FIG. 6A and FIG. 7A, in the present embodiment, in order to engage with the case 12, the case 12 includes a plurality of engaging holes 12a, and the fixing support 100 includes a rotary member 130 and a plurality of engaging members 140 (e.g., two). The rotary member 130 is rotatably disposed in the fixing base 110, and is fixed to the rotary base 120 so as to rotate with the rotary base 120 on the rotational axis R with respect to the fixing base 110. In the present embodiment, the rotary member 130 can be lock on a columnar portion of the mounting element 124 of the via a fastener F (e.g., a screw), so as to fix the rotary member 130 to the rotary base 120. The engaging members 140 are movably disposed inside the fixing base 110 to be moved to a releasing position (as shown in FIG. 6A and FIG. 7A) and an engaging position (as shown in FIG. 6B and FIG. 7B) with respect to the fixing base 110 according to a rotation of the rotary member 130. Each of the engaging members 140 has a plurality of engaging portions 140a. The engaging portions 140a are adapted to pass through the engaging holes 12a of the case 12. When the engaging members 140 are moved from the releasing position (as shown in FIG. 6A and FIG. 7A) to the engaging position (as shown in FIG. 6B and FIG. 7B) with respect to the fixing base 110, each of the engaging portions 140a engages a shoulder part S of the engaging hole 12a. In other embodiment, the number of the engaging member 140 may be one, and the number of the engaging portion included by each engaging member 140 may be one, as long as the engaging member 140 can move with respect to the fixing base 110 to enable the engaging portion to engage the shoulder part S of the corresponding engaging hole 12a.

Referring to FIG. 3, FIG. 4, FIG. 6A and FIG. 7A, in the present embodiment, the fixing support 100 may include a plurality of reset members 150 (e.g., two), and the reset members 150 are respectively disposed between the engaging members 140 and can reset the engaging members 140 back to the releasing position (as shown in FIG. 6A and FIG. 7A) with respect to the fixing base 110 so as to enable the engaging portions 140a to be detached from the shoulder parts S of the engaging holes 12a. In order to fix the relative positions between the rotary member 130 and the fixing base 110, namely, to fix the relative positions between the rotary base 120 and the fixing base 110, the rotary member 130 may have two mating recesses 130a, and each of the engaging members 140 may have a mating protrusion 140b. Therefore, when the rotary member 130 rotates to a specific position (as shown in FIG. 6A and FIG. 7A) with respect to the fixing base 110, the mating protrusions 140b respectively collaborate with the mating recesses 130a to enable the reset members 150 to reset the engaging members 140 back to the releasing position (as shown in FIG. 6A and FIG. 7A), so that each of the engaging portions 140a can be detached from the shoulder part S of the corresponding engaging hole 12a. When the rotary member 130 rotates (e.g., 45 degrees) to another specific position with respect to the fixing base 110, the mating protrusions 140b no longer collaborate with the mating recesses 130a , and thus each of the engaging portions 140a is maintained to engage the shoulder part S of the corresponding engaging hole 12a. In other embodiment, the number of the reset member 150 may be one, as long as the reset member 150 can apply a force on the engaging members 140 with respect to the fixing base 110 so as to reset the engaging members 140 back to the releasing position (as shown in FIG. 6A and FIG. 7A) with respect to the fixing base 110. In addition, the number of the mating recesses 130a and a distribution thereof on the rotary member 130 can be determined according to the specific angle (e.g., 0 degree, 90 degrees, 180 degrees or 360 degrees), with respect to the fixing base 110, of the rotary base 120.

Referring to FIG. 1, FIG. 2, FIG. 3 and FIG. 4 again, in the present embodiment, the fixing support 100 may include a bottom plate 112 with two side edges engagingly connected to the bottom of the fixing base 110 so as to accommodate the rotary member 130, the engaging members 140 and the reset members 150 in the bottom of the fixing base 110. The bottom plate 112 has a plurality of broken holes 112a for respectively enabling the engaging portions 140a to pass therethrough. The bottom plate 112 may have a plurality of auxiliary protrusions 112b for respectively engaging with the engaging holes 12a of the case 12.

In summary, in the present application, the fixing support adopts the means of rotation to engage or release the case. Therefore, via the fixing support, the user can single-handed rotate the case with respect to the target object so as to assemble the case onto the target object or disassemble the case from the target object.

It will be apparent to those skilled in the art that various modifications and variations can be made to the structure of the present application without departing from the scope or spirit of the application. In view of the foregoing, it is intended that the present application cover modifications and variations of this invention provided they fall within the scope of the following claims and their equivalents.

What is claimed is:

1. A fixing support, adapted to detachably fix a case onto a target object, the case being a protective shell coupled to a portable device or an outer casing of the portable device, the case having an engaging hole, the fixing support comprising:
   a fixing base;
   a rotary base, adapted to be assembled to the target object, wherein the fixing base has a plurality of axial hooks, the rotary base has an axial engaging hole, and the axial hooks engage with the axial engaging hole along the rotational axis so as to enable the rotary base to rotate along a rotational axis with respect to the fixing base;
   a rotary member, rotatably disposed in the fixing base, and fixed to the rotary base so as to rotate with the rotatory base on the rotational axis with respect to the fixing base; and
   an engaging member, movably disposed inside the fixing base to be moved to a releasing position and an engaging position with respect to the fixing base according to a rotation of the rotary member, wherein the engaging member has an engaging portion, the engaging portion is adapted to pass through the engaging hole, and when the engaging member is moved to the engaging position from the releasing position with respect to the fixing base, the engaging portion is provided for attachment to the engaging hole of the case.

2. The fixing support as recited in claim 1, further comprising:
a profiling element, connected to the rotary base to match an external shape of the target object.

3. The fixing support as recited in claim 1, further comprising:
a reset member, resetting the engaging member back to the releasing position with respect to the fixing base to enable the engaging portion to be detached from the engaging hole of the case.

4. The fixing support as recited in claim 3, wherein the rotary member has a mating recess, the engaging member has a mating protrusion, and when the rotary member rotates to the releasing position with respect to the fixing base, the mating protrusion collaborates with the mating recess to enable the reset member to reset the engaging member back to the releasing position, so as to enable the engaging portion to be detached from the engaging hole of the case.

5. The fixing support as recited in claim 3, wherein a number of the engaging member is two, the rotary member has two mating recesses, each of the engaging members has a mating protrusion, and when the rotary member rotates to a specific position with respect to the fixing base, the mating protrusions respectively collaborate with the mating recesses to enable the reset member to reset the engaging members back to the releasing position, so as to enable each of the engaging portions to be detached from the case.

6. The fixing support as recited in claim 4, wherein a number of the reset member is two, and the reset members are respectively disposed between the engaging members.

7. A fixing module, adapted to be coupled to a portable device and to detachably fix the portable device to a target object, the fixing module comprising:
a case, being a protective shell adapted to be coupled to the portable device, and having an engaging hole;
a fixing support, comprising:
a fixing base;
a rotary base, adapted to be assembled to the target object;
a rotary member, rotatably disposed in the fixing base, and fixed to the rotary base so as to rotate with the rotatory base on a rotational axis with respect to the fixing base; and
an engaging member, movably disposed inside the fixing base to be moved to a releasing position and an engaging position with respect to the fixing base according to a rotation of the rotary member, wherein the engaging member has an engaging portion, the engaging portion is adapted to pass through the engaging hole, and when the engaging member is moved to the engaging position from the releasing position with respect to the fixing base, the engaging portion engages a shoulder part of the engaging hole.

8. The fixing module as recited in claim 7, wherein the fixing base has a plurality of axial hooks, the rotary base has an axial engaging hole, and the axial hooks engage with the axial engaging hole along the rotational axis so as to enable the rotary base to rotate along the rotational axis with respect to the fixing base.

9. The fixing module as recited in claim 7, wherein the fixing base comprises a plurality of positioning recesses, the rotary base comprises a plurality of positioning protrusions, and when the rotary base rotates to a specific angle with respect to the fixing base, the positioning protrusions respectively collaborate with a portion of the positioning recesses to enable the rotary base to be fixed at the specific angle with respect to the fixing base.

10. The fixing module as recited in claim 7, wherein the fixing support further comprises:
a profiling element, connected to the rotary base to match an external shape of the target object.

11. The fixing module as recited in claim 7, wherein the fixing support further comprises:
a reset member, resetting the engaging member back to the releasing position with respect to the fixing base to enable the engaging portion to be detached from the shoulder part of the engaging hole.

12. The fixing module as recited in claim 11, wherein the rotary member has a mating recess, the engaging member has a mating protrusion, and when the rotary member rotates to the releasing position with respect to the fixing base, the mating protrusion collaborates with the mating recess to enable the reset member to reset the engaging member back to the releasing position, so as to enable the engaging portion to be detached from the shoulder part of the engaging hole.

13. The fixing module as recited in claim 11, wherein a number of the engaging hole is two, a number of the engaging member is two, the rotary member has two mating recesses, each of the engaging members has a mating protrusion, when the rotary member rotates to a specific position with respect to the fixing base, the mating protrusions respectively collaborate with the mating recesses to enable the reset member to reset the engaging members back to the releasing position, so as to enable each of the engaging portions to be detached from the shoulder part of the corresponding engaging hole.

14. The fixing module as recited in claim 13, wherein a number of the reset member is two, and the reset members are respectively disposed between the engaging members.

15. A fixing support, adapted to detachably fix a case onto a target object, the case being a protective shell coupled to a portable device or an outer casing of the portable device, the case having an engaging hole, the fixing support comprising:
a fixing base;
a rotary base, adapted to be assembled to the target object;
a rotary member, rotatably disposed in the fixing base, and fixed to the rotary base so as to rotate with the rotatory base on a rotational axis with respect to the fixing base; and
an engaging member, movably disposed inside the fixing base to be moved to a releasing position and an engaging position with respect to the fixing base according to a rotation of the rotary member, wherein the engaging member has an engaging portion, the engaging portion is adapted to pass through the engaging hole, and when the engaging member is moved to the engaging position from the releasing position with respect to the fixing base, the engaging portion is provided for attachment to the engaging hole of the case,
wherein the fixing base comprises a plurality of positioning recesses, the rotary base comprises a plurality of positioning protrusions, and when the rotary base rotates to a specific angle with respect to the fixing base, the positioning protrusions respectively collaborate with a portion of the positioning recesses to enable the rotary base to be fixed at the specific angle with respect to the fixing base.

* * * * *